US012754608B2

(12) United States Patent
Wei

(10) Patent No.: US 12,754,608 B2
(45) Date of Patent: Oct. 6, 2026

(54) INTERACTIVE METHOD, APPARATUS, ELECTRONIC DEVICE AND COMPUTER-READABLE STORAGE MEDIUM FOR CONTROLLING VIRTUAL OBJECT

(71) Applicant: Beijing Zitiao Network Technology Co., Ltd., Beijing (CN)

(72) Inventor: Yiming Wei, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/481,039

(22) Filed: Oct. 4, 2023

(65) Prior Publication Data

US 2024/0126372 A1 Apr. 18, 2024

(30) Foreign Application Priority Data

Oct. 13, 2022 (CN) ......................... 202211255891.6

(51) Int. Cl.

| | |
|---|---|
| ***G06F 3/01*** | (2006.01) |
| ***G06F 1/16*** | (2006.01) |
| ***G06F 3/033*** | (2013.01) |

(52) U.S. Cl.

CPC .............. *G06F 3/016* (2013.01); *G06F 1/163* (2013.01); *G06F 3/033* (2013.01)

(58) Field of Classification Search

CPC .......... G06F 1/163; G06F 3/011; G06F 3/016; G06F 3/033; G06F 3/0346; G06F 3/01;

(Continued)

(56) References Cited

U.S. PATENT DOCUMENTS

| | | | | |
|---|---|---|---|---|
| 2001/0021665 A1* | 9/2001 | Gouji | .................... | A63F 13/525 463/7 |
| 2008/0309615 A1* | 12/2008 | Sato | ........................ | A63F 13/10 345/156 |

(Continued)

FOREIGN PATENT DOCUMENTS

| | | |
|---|---|---|
| CN | 108905198 A | 11/2018 |
| CN | 110286760 A | 9/2019 |

(Continued)

OTHER PUBLICATIONS

Office Action received for Chinese Patent Application No. 202211255891.6, mailed on Aug. 1, 2026, 14 pages (7 pages of English Translation and 7 pages of Original Document).

(Continued)

*Primary Examiner* — Richard J Hong
(74) *Attorney, Agent, or Firm* — Astute IP Law Group

(57) ABSTRACT

The present disclosure relates to a virtual reality interactive method and apparatus, wherein the present disclosure provides an interactive method, apparatus, electronic device, and readable storage medium. The method provides feedback for a first virtual object and a second virtual object separately by determining a first feedback instruction related to control parameters and/or attribute parameters of the first virtual object and a second feedback instruction related to attribute parameters of the second virtual object in responding to an control instruction of the first virtual object, the first virtual object is a virtual object operated by a user, and the second virtual object is an interactive object of the first virtual object; and by executing the first feedback instruction and the second feedback instruction.

14 Claims, 9 Drawing Sheets

(58) Field of Classification Search
CPC ...... A63F 13/525; A63F 13/58; A63F 13/211; A63F 13/10; A63F 13/245; A63F 13/55; A63F 13/95; A63F 13/53; A63F 13/65; A63F 13/24; A63F 13/79; A63F 13/215; G09G 5/377; H02K 7/061; B06B 1/166
See application file for complete search history.

(56) References Cited

U.S. PATENT DOCUMENTS

| | | | | |
|---|---|---|---|---|
| 2011/0223999 | A1* | 9/2011 | Tsujino | A63F 13/55 463/37 |
| 2012/0077582 | A1* | 3/2012 | Noge | A63F 13/53 463/43 |
| 2012/0258802 | A1* | 10/2012 | Weston | A63F 13/95 463/43 |
| 2016/0162025 | A1* | 6/2016 | Shah | G06F 3/016 345/156 |
| 2018/0046251 | A1* | 2/2018 | Shah | A63F 13/24 |
| 2019/0244416 | A1* | 8/2019 | Tamaoki | G09G 5/377 |
| 2019/0321728 | A1* | 10/2019 | Imai | A63F 13/525 |
| 2020/0051407 | A1* | 2/2020 | Nakagawa | G06F 3/01 |
| 2020/0061460 | A1* | 2/2020 | Nakagawa | A63F 13/215 |
| 2020/0122028 | A1* | 4/2020 | Konishi | A63F 13/79 |
| 2020/0155937 | A1* | 5/2020 | Imai | A63F 13/245 |
| 2020/0238168 | A1* | 7/2020 | Konishi | G06F 3/016 |
| 2020/0238169 | A1* | 7/2020 | Konishi | A63F 13/79 |
| 2020/0387223 | A1 | 12/2020 | Gonzalez Franco et al. | |
| 2021/0113925 | A1* | 4/2021 | Imai | A63F 13/58 |
| 2021/0121915 | A1* | 4/2021 | Delson | H02K 7/061 |
| 2022/0331838 | A1* | 10/2022 | Delson | B06B 1/166 |
| 2023/0018367 | A1* | 1/2023 | Imai | A63F 13/211 |

FOREIGN PATENT DOCUMENTS

| | | | | |
|---|---|---|---|---|
| CN | 112295228 A | 2/2021 | | |
| CN | 113398565 A | 9/2021 | | |
| CN | 110681152 B | 7/2022 | | |
| KR | 20170119492 A | * 10/2017 | | A63F 13/65 |

OTHER PUBLICATIONS

Takamuku et al., "Design of Illusory Force Sensation for Virtual Fishing", Papers on Special Issue Subject "Game User Interface and Entertainment Computing", vol. 18, Issue 2, 2016, 8 pages (English Translation of Abstract).

* cited by examiner

INTERACTIVE METHOD, APPARATUS, ELECTRONIC DEVICE AND COMPUTER-READABLE STORAGE MEDIUM FOR CONTROLLING VIRTUAL OBJECT

TECHNICAL FIELD

The present application is based on and claims priority of China Application No. 202211255891.6, filed on Oct. 13, 2022, the disclosure of which is incorporated by reference herein in its entirety.

The present disclosure relates to the field of computer technology, and in particular, to an interactive method, apparatus, electronic device and readable storage medium.

BACKGROUND

With the rapid development of computer technology, electronic devices have more and more functionalities. Users can experience various interactive projects through electronic devices, for example various entertainment and leisure interactive projects, such as fishing, boxing, table tennis, tennis, etc. By means of controlling virtual objects in an interactive scene, users can manipulate other virtual objects in the interactive scene.

SUMMARY

The present disclosure provides an interactive method, apparatus, electronic device and readable storage medium.

In a first aspect, the present disclosure provides an interactive method, comprising:

- determining a first feedback instruction and a second feedback instruction in response to a control instruction for a first virtual object, the first feedback instruction being related to control parameters and/or attribute parameters of the first virtual object, the second feedback instruction being related to attribute parameters of the second virtual object; wherein, the first virtual object is a virtual object controlled by a user, and the second virtual object is an interactive object of the first virtual object;
- executing the first feedback instruction and the second feedback instruction.

In some embodiments, the executing the first feedback instruction and the second feedback instruction comprises:

- sending the first feedback instruction and/or the second feedback instruction to an interactive device, so that the interactive device executes the first feedback instruction and/or the second feedback instruction.

In some embodiments, the sending the first feedback instruction and/or the second feedback instruction to an interactive device, so that the interactive device executes the first feedback instruction and/or the second feedback instruction, comprises:

- sending the first feedback instruction and the second feedback instruction to a first interactive device, so that the first interactive device executes the first feedback instruction and the second feedback instruction, the first feedback instruction and the second feedback instruction being of different types.

In some embodiments, the first interactive device is an interactive handle, and the first feedback instruction and the second feedback instruction are used to set vibration amplitude and vibration frequency of the handle respectively.

In some embodiments, the first virtual object is a virtual fishing tool, and the second virtual object is a virtual fishing object.

In some embodiments, the sending the first feedback instruction and/or the second feedback instruction to an interactive device, so that the interactive device executes the first feedback instruction and/or the second feedback instruction, comprises:

- sending the first feedback instruction to a first interactive device to cause the first interactive device to execute the first feedback instruction; and,
- sending the first feedback instruction to a second interactive device to cause the second interactive device to execute the second feedback instruction.

In some embodiments, the method further comprises:

- displaying a first display content and a second display content in combination, the first display content corresponding to the first feedback instruction, and the second display content corresponding to the second feedback instruction.

In some embodiments, the displaying a first display content and a second display content in combination comprises:

- establishing a two-dimensional coordinate system; displaying the first display content and the second display content in combination under the two-dimensional coordinate system, the first display content and the second display content corresponding to different coordinate axes of the two-dimensional coordinate system respectively.

In some embodiments, the method is applied to a head-mounted display device, and the head-mounted display device is used to display a virtual reality scene, and the virtual reality scene includes the first virtual object and the second virtual object.

In a second aspect, the present disclosure provides an interactive apparatus, comprising:

- a first processing module configured to determine a first feedback instruction and a second feedback instruction in response to a control instruction for a first virtual object, the first feedback instruction being related to control parameters and/or attribute parameters of the first virtual object, the second feedback instruction being related to attribute parameters of the second virtual object; wherein, the first virtual object is a virtual object controlled by a user, and the second virtual object is an interactive object of the first virtual object;
- a second processing module configured to execute the first feedback instruction and the second feedback instruction.

In a third aspect, the present disclosure provides an electronic device, comprising: a memory and a processor;

- the memory is configured to store computer program instructions; and
- the processor is configured to execute the computer program instructions, so that the electronic device implements the interactive methods of the first aspect and any one of the first aspect.

In a fourth aspect, the present disclosure provides a readable storage medium, comprising: computer program instructions; at least one processor of an electronic device executes the computer program instructions, so that the electronic device implements the interactive methods of the first aspect and any one of the first aspect.

In a fifth aspect, the present disclosure provides a computer program product, at least one processor of an electronic device executes the computer program product, so that the electronic device implements the interactive methods of the first aspect and any one of the first aspect.

The present disclosure provides an interactive method, apparatus, electronic device, and readable storage medium, wherein the method provides feedback for a first virtual object and a second virtual object separately by determining a first feedback instruction related to control parameters and/or attribute parameters of the first virtual object and a second feedback instruction related to attribute parameters of the second virtual object in responding to an control instruction of the first virtual object, wherein, the first virtual object is a virtual object operated by a user, and the second virtual object is an interactive object of the first virtual object; and executing the first feedback instruction and the second feedback instruction.

BRIEF DESCRIPTION OF THE DRAWINGS

The accompanying drawings incorporated in and constituting a part of this specification illustrate embodiments consistent with the disclosure and serve to explain the principles of the disclosure along with the description.

In order to more clearly illustrate the technical solutions in the embodiments of the present disclosure or the conventional art, the following will briefly introduce the drawings that need to be used in the description of the embodiments or the conventional art. Apparently, for those of ordinary skill in the art, other drawings can also be obtained from these drawings without making creative labour.

DETAILED DESCRIPTION

Figure 1:
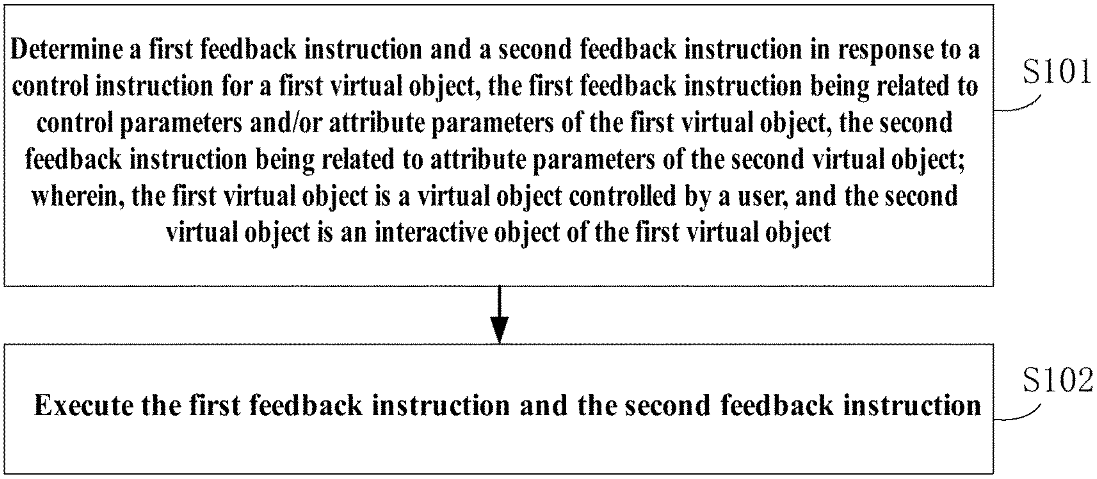
FIG. 1 is a schematic flowchart of an interactive method provided by one or more embodiments of the present disclosure.

In order to more clearly understand the above objectives, features and advantages of the present disclosure, the solutions of the present disclosure will be further described below. It should be noted that, the embodiments of the present disclosure and the features in the embodiments can be combined with each other in case of no conflict.

In the following description, many specific details are set forth in order to fully understand the present disclosure, but the present disclosure can also be implemented in other ways than described here; apparently, the embodiments in the description are only part of the embodiments of the present disclosure, and not all of the embodiments.

Exemplarily, the interactive methods provided by the present disclosure may be performed by an electronic device, where the electronic device may be, but not limited to, a tablet, a mobile phone(such as a folding screen mobile phone, a large-screen mobile phone, etc.), a wearable device, a vehicle-mounted device, a notebook, an ultra-mobile personal computer (UMPC), a netbook, a personal digital assistant(PDA), a smart TV, a smart screen, a high-definition TV, a 4K TV, a smart projector, an augmented reality (AR) and other devices, and the present disclosure does not impose any limitation on specific types of electronic devices. Wherein, the present disclosure does not impose any limitation on types of operating systems of electronic devices. For example, Android system, Linux system, Windows system, iOS system, etc. A user can control virtual objects in an interactive scene by directly operating an electronic device, for example, touching a display screen of the electronic device, pressing a button on the electronic device, etc. to control virtual objects in a screen displayed on the display screen of the electronic device, or by operating an interactive device(such as a gamepad, a wristband, a leg ring, etc.) connected to the electronic device to control virtual objects in a screen displayed on the display screen of the electronic device. In addition, the electronic device can also be a virtual reality (VR) device. When a VR device is used, wherein, the VR device can include a VR handle and a head-mounted display device, and the head-mounted display device can be integrated, or separated from the host, and the present disclosure does not impose any limitation on specific types of VR devices. A user can control virtual objects in a virtual scene screen (VR screen) of a virtual interactive scene displayed by the head-mounted display device through the VR handle. The present disclosure may also be applicable to other types of electronic devices and other forms of interactive scenes, and here is only an example.

In an interactive scene, some feedback is usually given to a user, so that the user can understand the state of an interaction and control virtual objects in the interactive scene according to the obtained feedback. However, currently, feedback from an interactive scene to a user is usually limited, which seriously affects the user's understanding of the interactive scene, resulting in a poor user experience. In order to solve the above technical problems, the present disclosure provides an interactive method, apparatus, electronic device and readable storage medium.

By the interactive method proposed by the present disclosure, the user is given with richer feedback so as to facilitate the user to understand and operate virtual objects according to the feedback of different virtual objects. The interactive states between virtual objects are changed, and therefore improves interaction fun and solves the problem of limited feedback information of existing virtual objects.

Next, the interactive methods provided by the present disclosure will be described in detail through some examples in combination with related drawings.

FIG. 1 is a schematic flowchart of an interactive method provided by one or more embodiments of the present disclosure. Referring to FIG. 1, the method of the involved embodiments comprises:

S101. Determining a first feedback instruction and a second feedback instruction in response to a control instruction for a first virtual object, the first feedback instruction being related to control parameters and/or attribute parameters of the first virtual object, the second feedback instruction being related to attribute parameters of the second virtual object; wherein, the first virtual object is a virtual object controlled by a user, and the second virtual object is an interactive object of the first virtual object.

S102. Executing the first feedback instruction and the second feedback instruction.

The user can enter an interactive scene by starting an application program installed in an electronic device, and can control the first virtual object in the interactive scene by operating the electronic device or an interactive device capable of data transmission with the electronic device, for example, changing the pose, moving speed, orientation, position in the interactive scene of first virtual object, and states of one or more components of the first virtual object, and further operating the second virtual object in the interactive scene by controlling the first virtual object.

Wherein, the control instruction for the first virtual object may be input by the user through the electronic device or an interactive device associated with the electronic device, or may be generated by an application program based on other collected data, and the control instruction may include changing the state of the first virtual object presented during an interactive process by the user for control parameters of the first virtual object, and the present disclosure does not have specifical limitations on the control parameters.

In addition, after starting the application program in the electronic device, the user can also adjust and configure the attribute parameters of the first virtual object and/or the second virtual object, so as to meet the user's personalized interaction requirements.

Wherein, the number of the first and second virtual objects in the interactive scene can be one or more, a plurality of the first virtual objects may be the same or different types of virtual objects, similarly, a plurality of the second virtual objects may also be the same or different types of virtual objects, which are not limited in the present disclosure. The first virtual object and the second virtual object may be different from one interactive scene to another interactive scene.

In some embodiments, an interactive screen displayed by the electronic device may include an image corresponding to the first virtual object and an image of the second virtual object; in some other embodiments, the image corresponding to the second virtual object may be permanently displayed on the interactive screen, or it may also be displayed or not displayed in the interactive screen according to the user's control on the first virtual object or according to the interaction state between the first virtual object and the second virtual object.

In addition, the application program in the electronic device can also control the electronic device or one or more interactive devices associated with the electronic device to execute a feedback instruction associated with the virtual object in the interactive scene, so as to give the user feedback associated with the virtual object.

Wherein, the first feedback instruction is associated with the first virtual object, which can give the user feedback associated with the first virtual object; similarly, the second feedback instruction is associated with the second virtual object, which can give the user feedback associated with the second virtual object.

The first feedback instruction and the second feedback instruction can be instructions with different operation types, such as display, play sound, vibration, etc., or they can be instructions for different parameter settings of the same operation type, such as display brightness and contrast, sound frequency and volume, vibration amplitude and frequency, etc. Wherein, the feedback instruction may include instructions of one or more operation type and instructions for one or more parameter settings under the same operation type. Alternatively, the first and second feedback instructions may also be instructions of the same operation type and for the same parameter settings.

Wherein, the first feedback instruction is associated with the control parameters and/or attribute parameters of the first virtual object, the control parameters may be determined based on the control instruction to the first virtual object, and the attribute parameters may be determined based on parameters of an object model corresponding to the first virtual object in the application program. Exemplarily, the first feedback instruction may be used to set the state of the electronic device or the state of the interactive device associated with the electronic device, so as to give the user feedback corresponding to the first virtual object.

The second feedback instruction may be related to the attribute parameters of the second virtual object, and the attribute parameters may be determined based on parameters of an object model corresponding to the second virtual object in the application program. Exemplarily, the second feedback instruction may be used to set the state of the electronic device or the state of an interactive device associated with the electronic device, so as to give the user feedback corresponding to the second virtual object.

The above attribute parameters of the first/second virtual object may include, but not limited to, one or more parameters such as the object type, model, size, color, material, and force state of the first/second virtual object configured by corresponding object model. This is only an example, not a limitation on specific attribute parameters. It can be understood that attribute parameters of virtual objects are different in different interactive scenes.

In addition, in some embodiments, the first feedback instruction and the second feedback instruction can be executed by the same device, and the user can be given feedback for different virtual objects through the same device, for example, it can be an electronic device, or it can be an interactive device associated with an electronic device. In some other embodiments, the first feedback instruction and the second feedback instruction can be executed by different devices respectively, so that the user can better feel the feedback for different virtual objects, for example, the first feedback instruction is sent to the first interactive device to be executed by the first interactive device, and the second feedback instruction is sent to the second interactive device to be executed by the second interactive device. The first interactive device and the second interactive device may be of the same type or different types of interactive devices.

Wherein, the first/second interactive devices may be, but not limited to, a gamepad, a VR handle, a leg ring, a wristband, a glove or other wearable devices.

The method of the embodiments provides feedback for a first virtual object and a second virtual object separately by determining a first feedback instruction related to control parameters and/or attribute parameters of the first virtual object and a second feedback instruction related to attribute parameters of the second virtual object in responding to an control instruction of the first virtual object, wherein, the first virtual object is a virtual object operated by a user, and the second virtual object is an interactive object of the first virtual object; and by executing the first feedback instruction and the second feedback instruction, thereby giving the user richer feedback, facilitating the user to understand and operate virtual objects according to the feedback of different virtual objects, changing interaction states between virtual objects, and improving interaction fun, thus solving the problem of limited feedback information of existing virtual objects.

Figure 2:
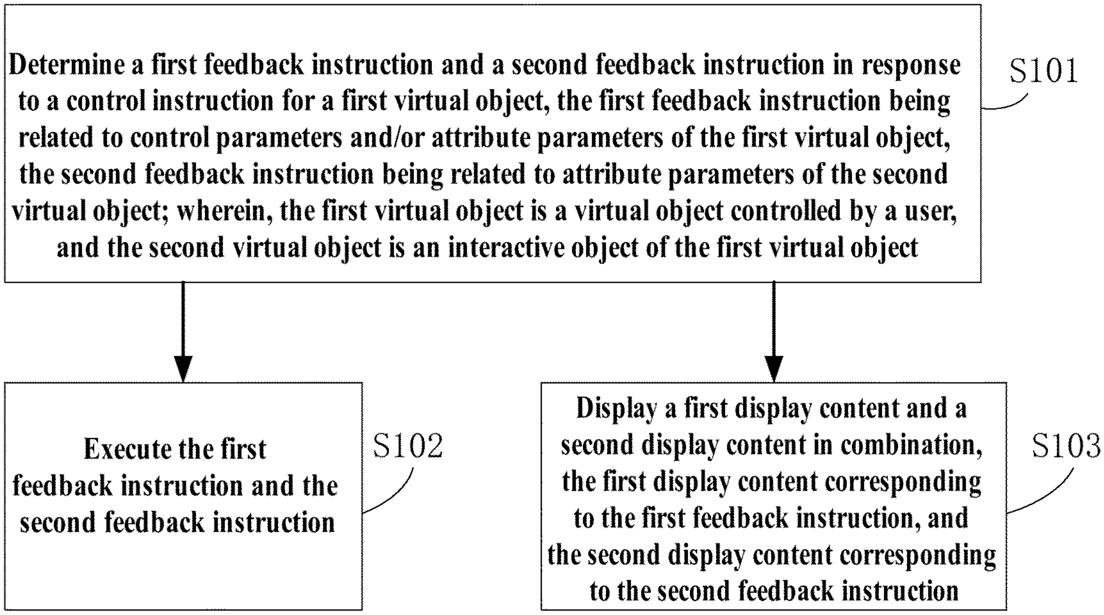
FIG. 2 is a schematic flowchart of an interactive method provided by one or more embodiments of the present disclosure.

FIG. 2 is a schematic flowchart of an interactive method provided by one or more embodiments of the present disclosure. Referring to FIG. 2, the method of the involved embodiments, on the basis of the embodiments shown in FIG. 1, after S101, further comprises:

S103. Displaying a first display content and a second display content in combination, the first display content corresponding to the first feedback instruction, and the second display content corresponding to the second feedback instruction.

The first display content may be obtained when the electronic device determines the first feedback instruction or may also be collected from a device (such as an electronic device or a first interactive device) that executes the first feedback instruction. For example, the first display content may include a waveform of a parameter to be set under the operation type indicated by the first feedback instruction, text content corresponding to a sound indicated by the first feedback instruction, and the like. The present disclosure does not have limitation on the implementation of acquiring the first display content.

Similarly, the second display content may be determined based on the second feedback instruction or may also be obtained from a device (such as an electronic device or a second interactive device) that executes the second feedback instruction. For example, the second display content may include a waveform of a parameter to be set under the operation type indicated by the first feedback instruction, text content corresponding to a sound indicated by the first feedback instruction, and the like. The present disclosure does not have limitation on the manner of acquiring the first display content and the second display content.

Wherein, displaying the first display content and the second display content can be understood as presenting the feedback for the first virtual object and the feedback for the second virtual object to the user in a visual manner, so that the user feels more intuitive. In addition, displaying the first display content and the second display content in combination enables the user to quickly obtain more information, for example, states presented by each of the first virtual object and the second virtual object in the interactive scene and an interaction state between the first virtual object and the second virtual object, so as to have a deeper understanding of the interactive scene, used to quickly build a control strategy combination for the first virtual object, and further change the interaction state of the first virtual object to the second virtual object, and improve the interaction fun.

Wherein, when displaying the first display content and the second display content in combination in the interactive screen, the display can be done in any form such as diagram, text, animation, etc., or in combination thereof, so as to meet the use's needs.

In some embodiments, by establishing a coordinate system, the first display content and the second display content can be mapped on different coordinate axes of the coordinate system respectively, and then the coordinate system mapped with the display content can be displayed on the interactive screen and presented to user. Wherein, the coordinate system may be, but not limited to, a two-dimensional coordinate system, a three-dimensional coordinate system, a cylindrical coordinate system, and a spherical coordinate system. In addition, when displaying the coordinate system in the interactive screen, the image area displaying the coordinate system can be set so as to block the main screen area of the interactive screen as less as possible, and facilitate the user to view information in the coordinate system as much as possible. For example, the coordinate system can be displayed at any position within the preset range close to the first virtual object without blocking the image corresponding to the first virtual object, since during an interactive process, the user's attention is usually more focused on the first virtual object controlled by himself, in order to facilitate the user to build a control strategy for the first virtual object, it can be displayed close to the first virtual object without blocking the first virtual object, and thus can obtain a better display effect. In some embodiments, the position of the image displaying the above first display content and the second display content in the interactive screen may change following the position of the image corresponding to the first virtual object in the interactive screen. It should be understood that the image displaying the above first display content and the second display content can also be fixed at a certain place on the interactive screen, so that the processing logic of the application program is simple, and the specific method can be flexibly configured according to requirements.

In addition, image processing can also be performed on the display area during display to present a more immersive interactive screen. The way of image processing may be, but not limited to, enhancement by one or more ways such as special effects, AR, and VR etc.

The method of the embodiments enables a user to obtain a large amount of information more intuitively and quickly by presenting to the user display content related to the feedback for a first virtual object and display content related to the feedback for a second virtual object in a combination of a visual manner and a combined display manner, thereby improving the user's ability to control strategy perception in interactive scenes, enabling the user to quickly build control strategy combinations, and improving user interaction experience.

It can be known from the foregoing description that the interactive method provided by the present disclosure can be applied to AR, VR and other scenes, and the VR scene will be taken as an example to illustrate.

Virtual Reality (VR) technology, also known as virtual reality environment or spiritual environment technology, is mainly realized by computer technology, using and integrating three-dimensional graphics technology, multimedia technology, simulation technology, display technology, servo technology, etc., with the help of devices such as computers to produce a realistic virtual world with multi-sensory experience such as three-dimensional vision, touch, smell etc., so that users in the virtual world can have an immersive feeling. With the continuous development of social productivity and scientific technology, all walks of life have increasingly strong demand for VR technology, and VR has gradually entered people's daily life to bring fun for life. For example, users can experience various VR scenes, for example, virtual reality scenes of sports category such as fishing, boxing, tennis, and table tennis, through VR devices. At present, VR usually focuses on enhancing the sense of immersion through a virtual reality screen presented by a head-mounted display device, and the user gets less feedback, which in turn leads to the user's weak perception of control strategies and poor VR experience.

Taking a fishing interactive scene as an example, currently, there are mainly following different types of VR program products that realize VR fishing: 1. By creating a situational awareness similar to a real fishing scene, it displays a fishing tool with a high degree of physical simulation (such as a fishing rod), and when a user adjusts a fishing strategy (such as adjusts a control strategy for the fishing rod) relying on subjective ideas, an interactive interface is called out, which will bring the user a stronger sense of immersion; 2. Through multi-view angle switching, it provides a viewing angle that cannot be provided in the real world, thereby improving the sense of sight during the entire fishing process, and due to rich environmental attributes that affect fishing restored in VR, the user has a high threshold for getting started and proficient; 3. It is based on a built-in task driver, and the physical simulation degree of fishing tools is low, and the overall interaction is relatively simple. Users get extremely limited feedback when they experience VR fishing through any of the above VR program products.

In the VR fishing interactive scene, the first virtual object is a virtual fishing tool, the second virtual object is a virtual fishing object, such as one or more types of fish, and the number of the second virtual object can be one or more, which are all configurable.

Exemplarily, the interactive method provided by the present disclosure is illustrated by taking a VR interactive scene as an example of a VR fishing interactive scene. Wherein, a VR device includes an integrated VR headset and a VR handle. The integrated VR headset is packaged with a VR fishing program, and can display corresponding VR screen based on the control of the VR fishing program. A user can experience VR fishing through wearing the integrated VR headset and starting the VR fishing program and controlling via the VR handle.

The first virtual object is a virtual fishing tool (may also be understood as a virtual fishing rod provided by the VR fishing program, the image of which can be displayed in the VR screen) in the VR fishing interactive scene, and the second virtual object is a kind of virtual fish provided by the VR fishing program, with which the user interacts by operating the VR handle to control the virtual fishing tool for fishing. The VR handle is equipped with a motor. In the VR fishing interactive scene, the VR handle can send handle data to the VR fishing program and get feedback instruction issued by the VR fishing program based on the handle data to control vibration of the motor, thereby simulating vibration situations of the fishing tool under different force states in real fishing scenes, and the user can experience a touch sensation close to reality.

Specifically, when the user operates the VR handle, the VR handle continuously sends handle data to the integrated VR headset, and the VR fishing program in the integrated VR headset sends a control instruction for the virtual fishing tool based on the handle data, and determines a first feedback instruction and a second feedback instruction in response to the control instruction, and send the first feedback instruction and the second feedback instruction to the VR handle to instruct the VR handle to execute the first feedback instruction and the second feedback instruction to control the vibration of the motor.

Wherein, the first feedback instruction is used to set the vibration amplitude of the motor, which may include information about magnitude of the vibration amplitude of the motor. The first feedback instruction may be determined according to control parameters determined by the user with respect to the control of the virtual fishing tool and attribute parameters, such as the force state of the fishing line part and/or fishing rod part, of the virtual fishing tool in the VR scene; the second feedback instruction is used to set the vibration frequency of the motor, which may include information about magnitude of the vibration frequency of the motor. The second feedback instruction may be determined according to attribute parameters of the virtual fishing object in the VR scene, such as the weight and vitality (which can be reflected by the vitality level) of a fish, etc.

The feedback for the virtual fishing tool and the feedback for the virtual fishing object are provided to the user by using the VR handle to execute the first feedback instruction and the second feedback instruction to control the vibration of the motor.

In this scene, the motor in the VR handle can be a broadband motor, which can realize separate feedback for the virtual fishing tool and the virtual fishing tool through the two dimensions of vibration amplitude and vibration frequency. The richer feedback information given to the user also facilitate the user to understand and operate virtual fishing tools according to different feedbacks, build a combination of control strategies for virtual fishing tools, and improve fishing experience.

In addition, during the user experience, it may be determined based on the first feedback instruction that the first display content includes information about the magnitude of the vibration amplitude of the motor, and it may be determined based on the second feedback instruction that the second display content includes information about the magnitude of the vibration frequency of the motor. Then the first display content and the second display content are combined and displayed in the VR screen. The information of the vibration frequency and vibration amplitude of the motor is displayed in combination on the VR screen through the integrated VR headset, so that the user can understand the attribute state of a fish, the attribute state of the fishing line part and/or the attribute state of the fishing rod part of the virtual fishing rod based on the vibration frequency and vibration amplitude of the motor, so as to determine a control strategy for the virtual fishing rod quickly. Wherein, the attribute state of the fish may include the vitality of the fish, which corresponds to the vibration frequency of the motor, and the vibration frequency is proportional to the vitality of the fish. The higher the vibration frequency, the more abundant the vitality of the fish. The attribute state of the fishing rod may include but not limited to: force states of the fishing rod part and the fishing line part, and the force states of the fishing rod part and the fishing line part correspond to the vibration amplitude of the motor, and the vibration amplitude is proportional to the force states of the fishing line/rod. The higher the vibration amplitude, the greater the force.

Combining the vibration frequency and vibration amplitude information of the motor can reflect a interaction state between a current type of virtual fish and the virtual fishing rod, wherein the interaction state between the type of virtual fish and the virtual fishing rod can comprise: an unhooked state, a state of a fish touching the bait (the bait is set on a hook, and the hook is fixed at one end of the fishing line), a state of a fish being hooked, and a state of a fish being caught.

In the VR fishing scene, the vibration frequency and vibration amplitude of the motor can be mapped on different coordinate axes of a two-dimensional coordinate system, wherein the horizontal axis is the vibration frequency and the vertical axis is the vibration amplitude, and then the two-dimensional coordinate system is displayed on the VR screen. In addition, in order to ensure that the user can obtain more information, the first display content may also include information such as the force curve of fishing line and/or the fishing rod of the virtual fishing rod, fishing depth information (the depth reached by the fishing rod in the water), and the like.

Exemplarily, FIG. 3A to FIG. 3G are schematic diagrams of VR screens in different states in a VR fishing interactive scene. FIG. 3A to FIG. 3G may be part of the VR screen. It should be understood that a VR fishing program may provide a more completive and immersive VR screen.

Figure 3A:
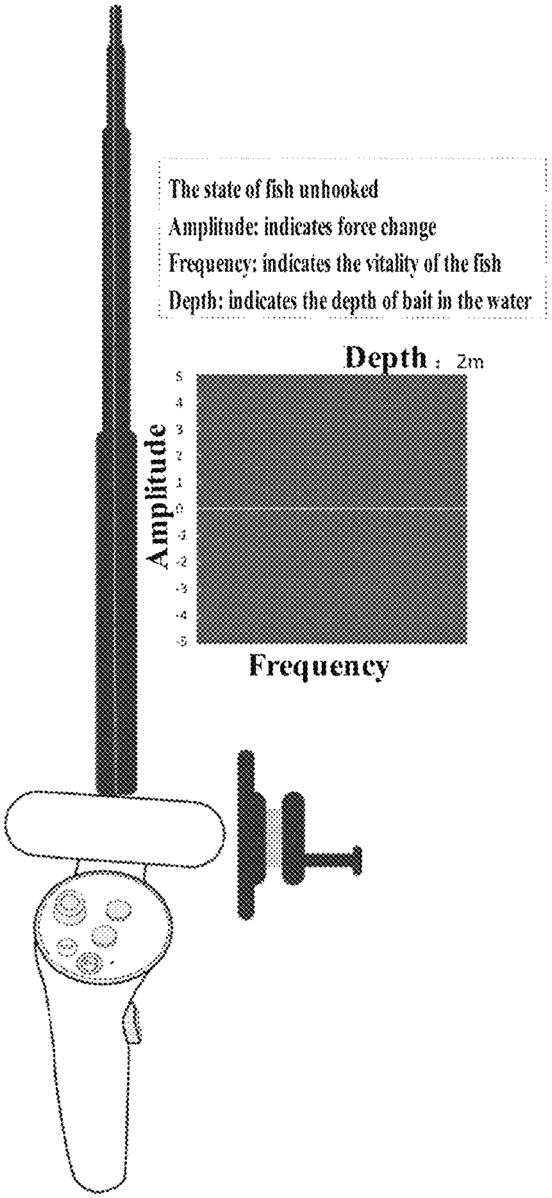
FIGS. 3A to 3G are schematic diagrams of virtual reality screens of virtual fishing scenes exemplarily shown in the present disclosure.

Referring to FIG. 3A, wherein, both the vibration amplitude and the vibration frequency of the motor are 0, which means that, currently, no fish is hooked, and no fish has touched the bait on the virtual fishing rod.

Figure 3B:
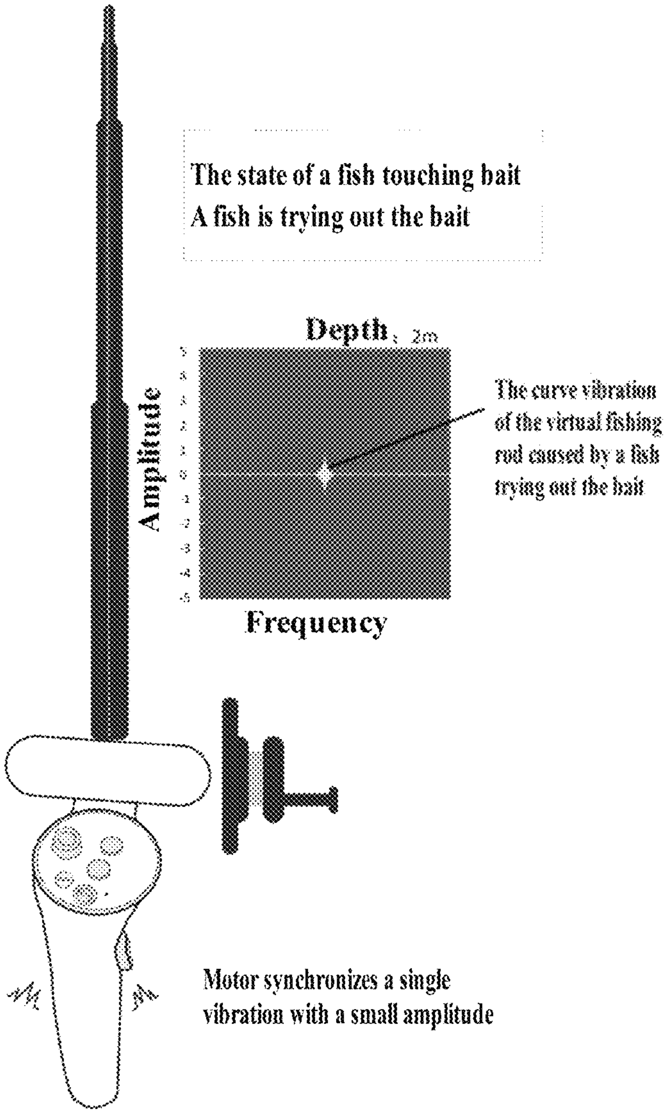

Referring to FIG. 3B, the motor synchronizes a single vibration with a small amplitude and a low vibration frequency, which means that, currently, a fish is touching the bait for trying out, and the user can determine a control strategy as no need to do any operation for the virtual fishing rod.

Figure 3C:
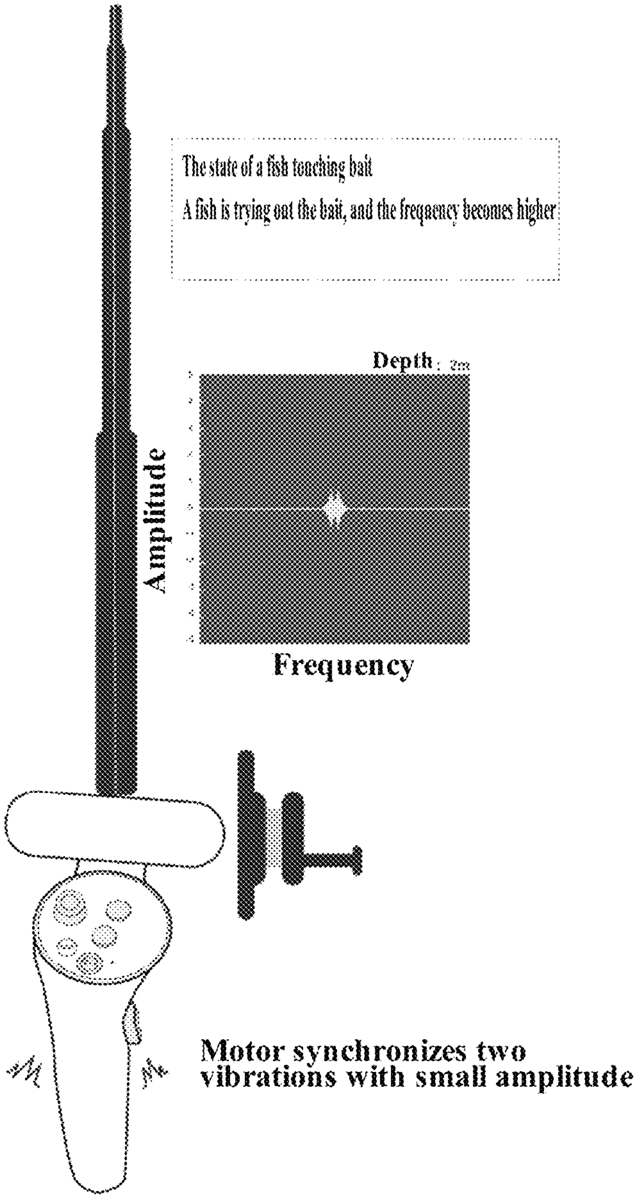

Referring to FIG. 3C, the motor synchronizes twice vibration with small amplitude, and the vibration frequency is higher than that shown in FIG. 3B, which means that, currently, a fish is touching the bait for trying out, and the force for trying out is greater than that shown in FIG. 3B. The user can determine a control strategy as no need to do any operation for the virtual fishing rod.

Combined with FIG. 3B and FIG. 3C, the vibration frequency and vibration amplitude of the motor both have changed, and the interaction states between the virtual fishing rod and the fish are different, but the determined control strategy may be the same.

Figure 3D:
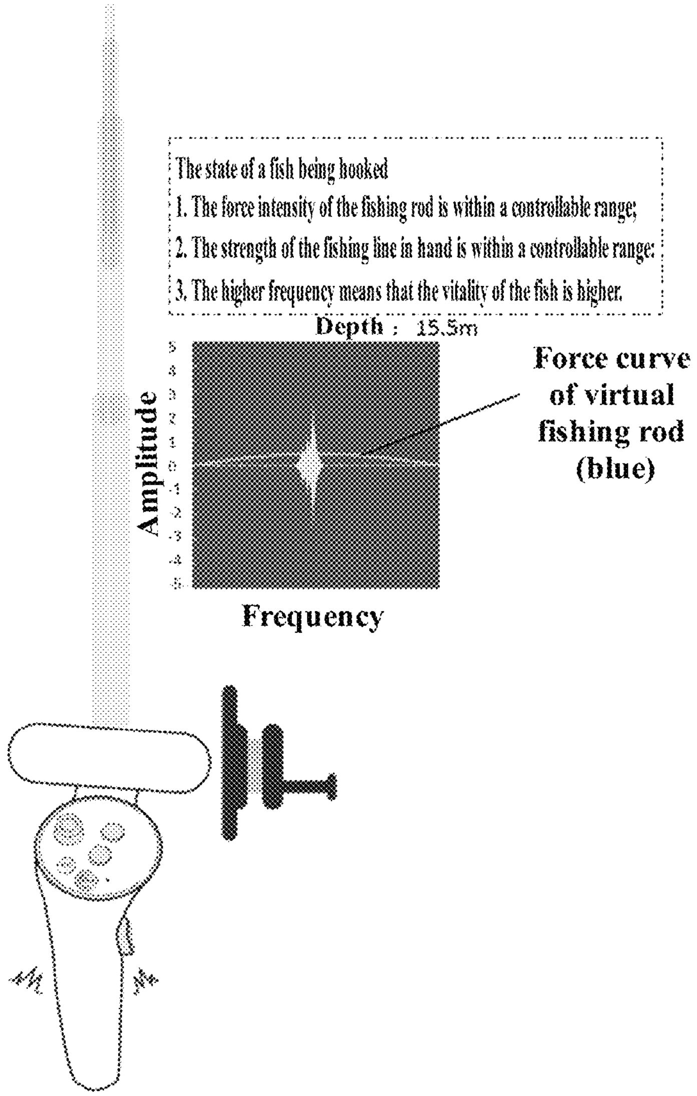

Referring to FIG. 3D, the vibration amplitude of the motor increases, and the vibration frequency is higher, which means that, currently, a fish has been hooked, and the force intensity of the fishing rod is in the controllable range, the force intensity of the fishing line is in the controllable range, and the high motor vibration frequency indicates the vitality of the fish is high. The user can confirm that forces on the fishing rod and fishing line currently are both within a tolerable range. The user can determine a control strategy as to tighten the fishing line normally to catch the fish without putting a long fishing line to walk the fish.

Figure 3E:
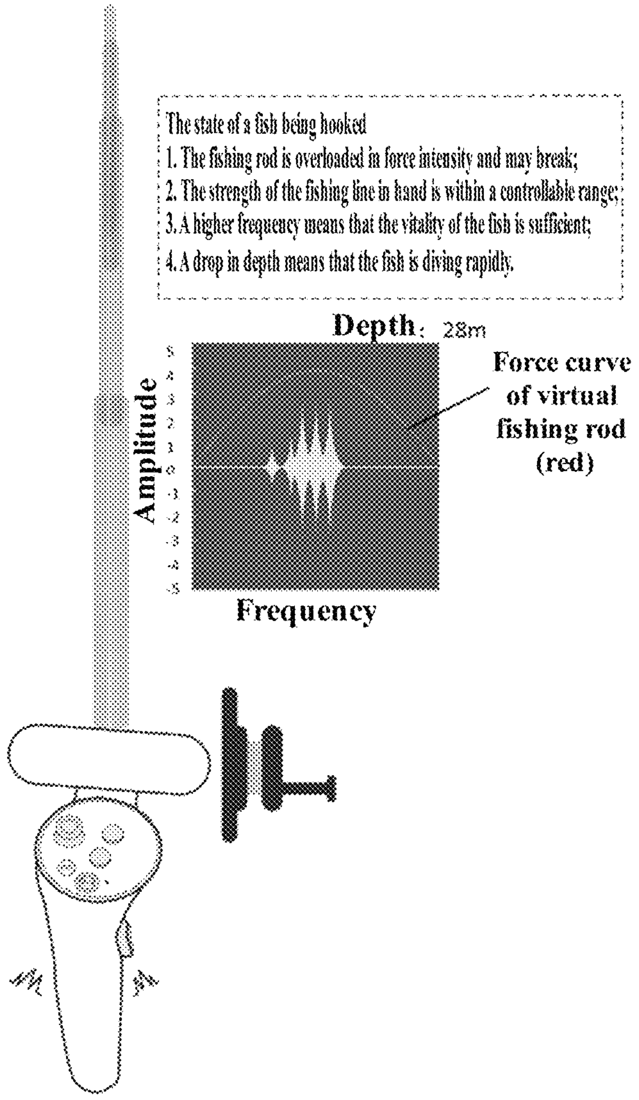

Referring to FIG. 3E, the vibration amplitude of the motor has increased compared to that shown in FIG. 3D, and the vibration frequency range and frequency value have both increased, which means that, currently, a fish has been hooked, and the fishing rod is overloaded in force intensity and may break, and the fishing line is overloaded in force intensity and may break. The high vibration frequency of the motor indicates that the vitality of the fish is high. Based on this, the user can determine a control strategy as to require to put a long fishing line to walk the fish to prevent excessive fish activity to cause the rod and/or line broken.

Figure 3F:
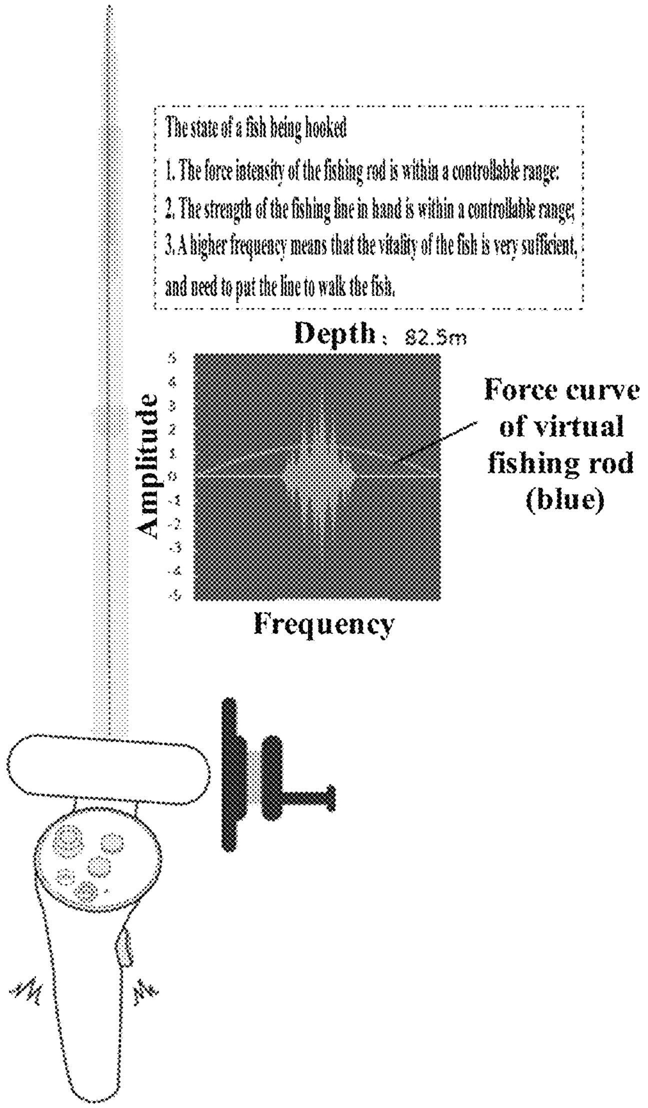

Referring to FIG. 3F, the vibration amplitude of the motor has increased compared to that shown in FIG. 3E, and the vibration frequency range and frequency value have both increased, which means that, currently, a fish has been hooked, and the force intensity of the fishing rod is within an acceptable range, but the fishing line is overloaded in force intensity and may break. The high vibration frequency of the motor indicates that the vitality of the fish is high. Based on this, the user can quickly build an interaction strategy to determine the need to walk the fish with a long fishing line to prevent the fish from decoupling and the fish line broken.

Figure 3G:
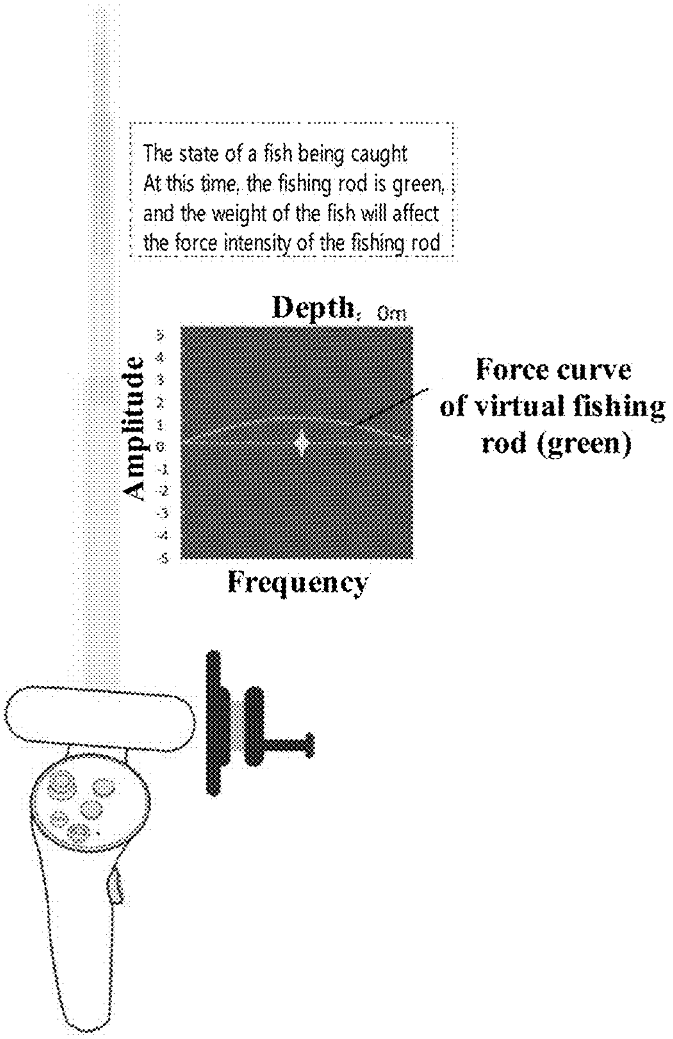

On the basis of FIG. 3E and FIG. 3F, the interaction state between the virtual fishing rod and the virtual fish has further changed, and the collected feedback information is shown in FIG. 3G, and the vibration amplitude and frequency of the motor have decreased compared to that shown in FIG. 3E and FIG. 3F, which means that, currently, a fish has been caught, and force intensities of the fishing rod and fishing line are both within an acceptable range. At this time, the weight of the fish will affect the force intensities of the fishing rod and fishing line. The user can determine a control strategy as to adjust the fishing speed according to the weight of the fish and then use other tools.

In the schematic diagrams shown in FIG. 3A to FIG. 3G, force curves of the fishing rod/line can also be displayed. Under different force intensities, force curves of the fishing rod/line can be distinguished by different colors, and the fishing rod part of the virtual fishing tool in the VR screen can also be distinguished by using the color corresponding to the force intensity. During the interaction, the user can determine whether the fishing rod/line is overloaded in force quickly according to the color of the virtual fishing rod in the VR screen and the colors of the force curves of the fishing rod/line, and determine a control strategy. Exemplarily, as shown in FIG. 3A to FIG. 3G, the force curves of the fishing rod/fishing line can be displayed in a two-dimensional coordinate system in combination, and when focusing on the image area of the two-dimensional coordinate system, the user can obtain sufficient feedback information for building a control strategy combination for a virtual fishing rod. Exemplarily, in the embodiments shown in FIG. 3A to FIG. 3C, the force curves of the virtual fishing rod and the fishing rod/fishing line can be displayed in gray; in the embodiments shown in FIG. 3D, the force curves of the virtual fishing rod and the fishing rod/fishing line can be displayed in blue; in the embodiments shown in FIG. 3E, the force curves of the virtual fishing rod and fishing rod/line can be displayed in red; in the embodiments shown in FIG. 3F, the force curves of the virtual fishing rod and the fishing rod/fishing line can be displayed in combination of blue and red; in the embodiments shown in FIG. 3G, the force curves of the virtual fishing rod and the fishing rod/fishing line can be displayed in green.

In the schematic diagrams shown in FIGS. 3A to 3G, fishing depth information is also displayed in the two-dimensional coordinate system. Different fishing depths may be suitable for different types of fish. Displaying fishing depth information is beneficial for users to adjust the virtual fishing rod based on fishing depth. For example, specifications of any one or more components such as rod joints, rod caps, wheel seats, handles, wire loops, hooks, etc., are adjusted to adapt to fishes that live in corresponding fishing depth. And the fishing depth information is displayed. When a fish is hooked, it can also allow the user to know the depth change state of the fish that has been hooked, and guide the user to perform operations of tightening the fishing line or lengthening the fishing line. It should be understood that when a fish is hooked, the depth of the fish in the water is the same as the depth reached by the fishing rod in the water. As shown in FIG. 3A to FIG. 3G, the fishing depth information can be displayed on the outer edge of a certain side of the image area where the two-dimensional coordinate system is located, and the waveform of the vibration frequency and vibration amplitude of the motor in the two-dimensional coordinate system can be avoided as much as possible.

In addition, as shown in FIG. 3A to FIG. 3G, in order to create a stronger sense of atmosphere, the above information can be displayed in the form of augmented reality (AR) in a VR interactive scene. For example, a specialized instrument apparatus can be virtualized in a VR interactive scene using augmented reality technology, through which feedback information, force curves of fishing rod/line, and fishing depth information, etc. are displayed, and the user wears an integrated VR headset as if in the VR interactive scene in person, and can watch the specialized instrument apparatus with enhanced effects therein.

It should be understood that the above first display content and second display content can also be displayed in combination in the VR screen corresponding to the VR interactive scene, without enhancing the VR interactive scene; in addition, display parameters such as the transparency, brightness, and display color of corresponding image area can be set when displaying, to achieve better display effect.

It should also be noted that in the embodiments shown in FIG. 3A to FIG. 3G, text description about interaction states in the dotted line boxes and the lines and texts pointing to force curves in the two-dimensional coordinate system may not be displayed. Alternatively, it may also be displayed when the user is guided to understand the displayed content in the two-dimensional coordinate system, and will not be displayed after the user is familiar with the meaning of the displayed content in the two-dimensional coordinate system.

Exemplarily, a VR interactive scene is illustrated as an example of a VR boxing event interactive scene, wherein a VR device includes an integrated VR headset and a VR handle, and the integrated VR headset is packaged with a VR boxing program, and can display corresponding VR screen based on the control of the VR boxing program. A user can experience VR boxing by wearing the integrated VR headset and starting the VR boxing program and controlling via the VR handle.

The first virtual object is a virtual boxing glove (may also be understood as a virtual boxing glove provided by the VR boxing program, which can be displayed in the VR screen) in the VR boxing interactive scene, and the second virtual object is a virtual sandbag provided by the VR boxing program, with which the user interacts by operating the VR handle to control the virtual boxing gloves. The VR handle is equipped with a motor. In the VR boxing interactive scene, the VR handle can send the handle data to the VR boxing program and get feedback instruction issued by the VR boxing program based on the handle data to control vibration of the motor, thereby simulating the real touch sensation when a boxing glove hits a sandbag in a real boxing scene, and the user can experience a touch sensation the close to reality.

Specifically, when the user operates the VR handle, the VR handle continuously sends handle data to the integrated VR headset, and the VR boxing program in the integrated VR headset sends a control instruction for the virtual boxing glove based on the handle data, and determines a first feedback instruction and a second feedback instruction in response to the control instruction, and sent the first feedback instruction and the second feedback instruction to the VR handle to instruct the VR handle to execute the first feedback instruction and the second feedback instruction to control the vibration of the motor.

Wherein, the first feedback instruction is used to set the vibration amplitude of the motor, which may include information about magnitude of the vibration amplitude of the motor. The first feedback instruction may be determined according to control parameters determined by the user with respect to the control of the virtual boxing glove and attribute parameters, such as the hitting strength of the virtual boxing glove, of the virtual boxing glove in the VR scene; the second feedback instruction is used to set the vibration frequency of the motor, which may include information about magnitude of the vibration frequency of the motor. The second feedback instruction may be determined according to attribute parameters of the virtual sandbag in the VR scene, such as the degree of force, etc.

The feedback for the virtual boxing glove and the feedback for the virtual sandbag are provided to the user by using the VR handle to execute the first feedback instruction and the second feedback instruction to control the vibration of the motor.

In this scene, the motor in the VR handle can be a broadband motor, which can realize separate feedback for the virtual boxing glove and the virtual sandbag through the two dimensions of vibration amplitude and vibration frequency. The richer feedback information given to the user also facilitate the user to understand and operate virtual boxing gloves according to different feedbacks, build a combination of control strategies for virtual boxing gloves, and improve boxing experience.

In addition, during the user experience, it may be determined based on the first feedback instruction that the first display content includes information about the magnitude of the vibration amplitude of the motor, and it may be determined based on the second feedback instruction that the second display content includes information about the magnitude of the vibration frequency of the motor. Then the first display content and the second display content are combined and displayed in the VR screen. The information of the vibration frequency and vibration amplitude of the motor is displayed in combination on the VR screen through the integrated VR headset, so that the user can understand the hitting force of the virtual boxing glove, speed and and force state of the virtual sandbag based on the vibration frequency and vibration amplitude of the motor, so as to determine a control strategy for the virtual boxing quickly.

Wherein, during the interaction, the information of the vibration frequency and vibration amplitude of the motor are displayed in combination through the two-dimensional coordinate system through the integrated VR headset. When the virtual boxing glove does not hit the virtual sandbag, the vibration frequency and vibration amplitude of the motor are 0, with the contact between the virtual boxing glove and the virtual sandbag, the vibration frequency and vibration amplitude of the motor increase, which means that the boxing force is increased. By displaying the information of the vibration frequency and vibration amplitude of the motor on the VR screen, the user can determine a control strategy as to increase or decrease the hitting force. In addition, the contact duration between the virtual boxing glove and the virtual sandbag can also be displayed on the VR screen, and the user can also determine the control strategy as to increase or decrease the hitting speed. Similar to the VR fishing interactive scene, based on different hitting strength and speed, it can be displayed in different colors, so that users can quickly build a control strategy combination through the color of the data displayed in the image area of the two-dimensional coordinate system. In addition, in the VR boxing interactive scene, feedback information and contact duration information can also be displayed by way of augmented reality to create a sense of atmosphere.

In the above embodiments shown in the VR fishing interactive scene and the VR boxing interactive scene, the motor provided in the VR handle is a broadband motor, and the vibration frequency range of the broadband motor is relatively large, and the response speed is fast, which can meet the requirements of the VR interactive scene to restore the touch sensation of the real world, and by setting states of the broadband motor in the two dimensions of vibration amplitude and vibration frequency, give users more abundant feedback, which is convenient for users to understand interaction states and build a combination of control strategies for virtual objects quickly.

Similarly, the method provided in this disclosure can also be applied to other VR interactive scenes, such as VR tennis interactive scenes, VR table tennis interactive scenes, etc. By displaying corresponding feedback information in a similar manner, users are enabled to build control strategies quickly, thus improving experience and feel.

Exemplarily, the present disclosure further provides an interactive apparatus.

Figure 4:
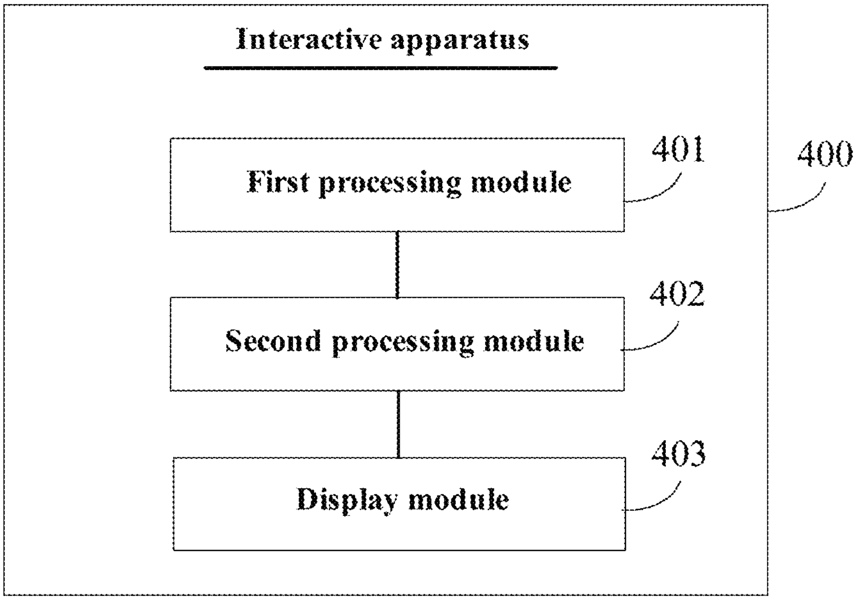
FIG. 4 is a schematic structural diagram of an interactive apparatus provided by one or more embodiments of the present disclosure.

FIG. 4 is a schematic structural diagram of an interactive apparatus provided by one or more embodiments of the present disclosure. Referring to FIG. 4, the interactive apparatus 400 provided in the embodiments comprises:

a first processing module 401 configured to determine a first feedback instruction and a second feedback instruction in response to a control instruction for the first virtual object, the first feedback instruction being related to control parameters and/or attribute parameters of the first virtual object, the second feedback instruction being related to attribute parameters of the second virtual object; wherein, the first virtual object is a virtual object controlled by a user, and the second virtual object is an interactive object of the first virtual object;

a second processing module 402 configured to execute the first feedback instruction and the second feedback instruction.

In some embodiments, the second processing module 402 is specifically configured to send the first feedback instruction and/or the second feedback instruction to an interactive device, so that the interactive device executes the first feedback instruction and/or the second feedback instruction.

In some embodiments, the second processing module 402 is specifically configured to send the first feedback instruction and the second feedback instruction to a first interactive device, so that the first interactive device executes the first feedback instruction and the second feedback instruction, the first feedback instruction and the second feedback instruction being of different types.

In some embodiments, the first interactive device is an interactive handle, and the first feedback instruction and the second feedback instruction are used to set the vibration amplitude and vibration frequency of the handle respectively.

In some embodiments, the first virtual object is a virtual fishing tool, and the second virtual object is a virtual fishing object.

In some embodiments, the second processing module 402 is specifically configured to send the first feedback instruction to a first interactive device so that the first interactive device executes the first feedback instruction; and send the first feedback instruction to a second interactive device so that the second interactive device executes the second feedback instruction.

In some embodiments, it also comprises: a display module 403 configured to display a first display content and a second display content in combination, the first display content corresponding to the first feedback instruction, and the second display content corresponding to the second feedback instruction.

In some embodiments, the display module 403 is configured to establish a two-dimensional coordinate system; display the first display content and the second display content in combination in the two-dimensional coordinate system, the first display content and the second display content corresponding to different coordinate axes of the two-dimensional coordinate system respectively.

In some embodiments, the apparatus 400 is applied to a head-mounted display device, and the head-mounted display device is used to display a virtual reality scene, and the virtual reality scene includes the first virtual object and the second virtual object.

The apparatus provided in the embodiments can be used to execute the technical solutions of any of the foregoing method embodiments, and their implementation principles and technical effects are similar, which can be referred to the detailed description of the foregoing method embodiments. For the sake of brevity, details are not repeated here.

Exemplarily, the present disclosure provides an electronic device, comprising: one or more processors; a memory; and one or more computer programs; wherein the one or more computer programs are stored in the memory; and when executing the one or more computer programs, the one or more processors enable the electronic device to implement the interactive methods of the foregoing embodiments.

Exemplarily, the present disclosure provides a chip system, which is applied to an electronic device including a memory and a sensor; the chip system comprises: a processor; which executes the interactive methods of the foregoing embodiments.

Exemplarily, the present disclosure provides a computer-readable storage medium having a computer program stored thereon, which, when executed by a processor, causes an electronic device implements the interactive methods of the foregoing embodiments.

Exemplarily, the present disclosure provides a computer program product, which, when run on a computer, causes the computer to execute the interactive methods of the foregoing embodiments.

It should be noted that, here, relative terms such as "first" and "second" are used to distinguish one entity or operation from another entity or operation, and do not necessarily require or imply any such actual relationship or order between these entities or operations. Furthermore, the term "comprises", "includes" or any other variation thereof is intended to cover a non-exclusive inclusion such that a process, method, article or device comprising a series of elements includes not only those elements, but also includes elements not expressly listed, or elements inherent in such process, method, article, or device. Without further limitations, an element defined by the phrase "comprising one . . . " does not exclude the presence of additional identical elements in the process, method, article or apparatus comprising said element.

The above descriptions are only specific implementation of the present disclosure, so that those skilled in the art can understand or implement the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to the embodiments described herein, but is to be accorded the widest scope consistent with the principles and novel features disclosed herein.

What is claimed is:

1. An interactive method, comprising:

determining both a first feedback instruction and a second feedback instruction in response to a control instruction for a first virtual object; and instructing an interactive device to execute the first feedback instruction and the second feedback instruction concurrently;

wherein a first interactive device is an interactive handle, the first virtual object is a virtual object controlled by a user, and a second virtual object is an interactive object of the first virtual object;

wherein the first feedback instruction is configured to set vibration amplitude of the handle according to control parameters determined by the user with respect to control of the first virtual object and attribute parameters of the first virtual object in a VR scene, and the second feedback instruction is configured to set vibration frequency of the handle according to attribute parameters of the second virtual object in the VR scene; and wherein the method further comprises:

establishing a two-dimensional coordinate system:

displaying a first display content and a second display content in combination under the two-dimensional coordinate system, the first display content corresponding to the first feedback instruction, and the second display content corresponding to the second feedback instruction, and the first display content corresponding to one coordinate axis of the two-dimensional coordinate system and the second display content corresponding to the other coordinate axis of the two-dimensional coordinate system.

2. The method according to claim 1, wherein the executing the first feedback instruction and the second feedback instruction comprises:

sending at least one of the first feedback instruction and the second feedback instruction to the interactive device, so that the interactive device executes at least one of the first feedback instruction and the second feedback instruction.

3. The method according to claim 2, wherein the sending at least one of the first feedback instruction and the second feedback instruction to the interactive device, so that the interactive device executes at least one of the first feedback instruction and the second feedback instruction, comprises:

sending the first feedback instruction and the second feedback instruction to the first interactive device, so that the first interactive device executes the first feedback instruction and the second feedback instruction, the first feedback instruction and the second feedback instructions being of different types.

4. The method according to claim 2, wherein the sending at least one of the first feedback instruction and the second feedback instruction to the interactive device, so that the interactive device executes at least one of the first feedback instruction and the second feedback instruction, comprises:

sending the first feedback instruction to a first interactive device to cause the first interactive device to execute the first feedback instruction; and, sending the first feedback instruction to a second interactive device to cause the second interactive device to execute the second feedback instruction.

5. The method according to claim 1, wherein the first virtual object is a virtual fishing tool, and the second virtual object is a virtual fishing object.

6. The method according to claim 1, wherein the method is applied to a head-mounted display device, and the head-mounted display device is used to display a virtual reality scene, and the virtual reality scene includes the first virtual object and the second virtual object.

7. An electronic device, comprising:

a memory and a processor;

the memory is configured to store computer program instructions;

the processor is configured to execute the computer program instructions, so that the electronic device implement the interactive method according to claim 1.

8. A non-transitory readable storage medium, comprising computer program instructions executable by an electronic device so that the electronic device implements the interactive method according to claim 1.

9. A computer program product executable by an electronic device so that the electronic device implements the interactive method according to claim 1.

10. An interactive apparatus, comprises:

a first processing module configured to determine both a first feedback instruction and a second feedback instruction in response to a control instruction for a first virtual object; and a second processing module configured to instruct an interactive device to execute the first feedback instruction and the second feedback instruction concurrently;

wherein a first interactive device is an interactive handle, the first virtual object is a virtual object controlled by a user, and a second virtual object is an interactive object of the first virtual object;

wherein the first feedback instruction is configured to set vibration amplitude of the handle according to control parameters determined by the user with respect to control of the first virtual object and attribute parameters of the first virtual object in a VR scene, and the second feedback instruction is configured to set vibration frequency of the handle according to attribute parameters of the second virtual object in the VR scene; and wherein the apparatus further comprise a third processing module configured to establish a two-dimensional coordinate system, and display a first display content and a second display content in combination under the two-dimensional coordinate system, the first display content corresponding to the first feedback instruction, and the second display content corresponding to the second feedback instruction, and the first display content corresponding to one coordinate axis of the two-dimensional coordinate system and the second display content corresponding to the other coordinate axis of the two-dimensional coordinate system.

11. The interactive apparatus according to claim 10, wherein the second processing module further is further configured to send at least one of the first feedback instruction and the second feedback instruction to the interactive device, so that the interactive device executes at least one of the first feedback instruction and the second feedback instruction.

12. The interactive apparatus according to claim 11, wherein the second processing module further is further configured to send the first feedback instruction and the second feedback instruction to the first interactive device, so that the first interactive device executes the first feedback instruction and the second feedback instruction, the first feedback instruction and the second feedback instructions being of different types.

13. The interactive apparatus according to claim 11, wherein the second processing module further is further configured to send the first feedback instruction to the first interactive device to cause the first interactive device to execute the first feedback instruction; and send the first feedback instruction to a second interactive device to cause the second interactive device to execute the second feedback instruction.

14. The interactive apparatus according to claim 10, wherein the first virtual object is a virtual fishing tool, and the second virtual object is a virtual fishing object.

* * * * *